United States Patent [19]

Miyake et al.

[11] Patent Number: 4,937,591
[45] Date of Patent: Jun. 26, 1990

[54] APPARATUS FOR CORRECTING QUANTITY OF LIGHT FROM OPTICAL PRINTER

[75] Inventors: Shigeru Miyake, Ikeda; Tomio Nakaya, Yokohama, both of Japan

[73] Assignee: Ricoh Company Limited, Tokyo, Japan

[21] Appl. No.: 259,165

[22] Filed: Oct. 18, 1988

[30] Foreign Application Priority Data

Oct. 19, 1987 [JP] Japan .................................. 62-261816

[51] Int. Cl.$^5$ ...................... G01D 9/42; G01D 15/14; H04N 1/23
[52] U.S. Cl. ................................ 346/107 R; 358/302; 346/160
[58] Field of Search .................... 346/107 R, 108, 160; 358/298, 302

[56] References Cited

U.S. PATENT DOCUMENTS 4,727,428  2/1988  Futatsugi .................. 346/107 R
4,750,010  6/1988  Ayers ....................... 346/107 R
4,757,327  7/1988  Henzi ....................... 346/107 R Primary Examiner—Bruce A. Reynolds
Assistant Examiner—Scott A. Roger
Attorney, Agent, or Firm—Gifford, Groh, Sheridan, Sprinkle and Dolgorukov

[57] ABSTRACT

An apparatus for correcting the quantity of light from an optical printer arranged a plural number of luminous elements therein, which comprises a producing circuit for producing a plural number of timing signals of different pulse widths and output timing, and a combining circuit for combining the timing signals according to the correcting data, thereby driving the respective luminous elements based on a correcting signal obtained by combination thereof.

9 Claims, 3 Drawing Sheets

APPARATUS FOR CORRECTING QUANTITY OF LIGHT FROM OPTICAL PRINTER

BACKGROUND OF THE INVENTION

1. Field of the Invention

The present invention relates to an apparatus for correcting the quantity of light from an optical printer in which unevenness of the respective luminous elements is reduced to make the printing density homogeneous.

2. Description of the Prior Art

An optical printer in which a plural number of LED's (light-emitting diodes) are arranged in the form of a matric to form a known LED dot array is provided with an LED lighting circuit as shown in FIG. 4. In the drawing, a shift register 1 to which lighting data are applied, the latch circuit thereof 2, and the driving transistor Tr of an LED 3 are connected to a power source Vcc.

The shift register 1 and the latch circuit 2 are provided in a number according to those of the LED dots and the shift register 1 contains the lighting data which are temporarily memorized. When a set signal is applied thereto, the data signal of the shift register 1 is applied to the transistor Tr which is the driving portion of the LED 3 to turn the LED on. When a reset signal is applied to the latch circuit 2, the LED 3 is turned off. FIG. 5 illustrates one example of the lighting data. The data correspond, as illustrated in the drawing, to the dot number (n+1, n, and n−1) and applied thereto by the number of times of m as illustrated in FIG. 6, so the above m operations are repeated.

If the lighting data of the n-th LED $3_n$ indicate [1] at the first and second lighting and [0] at the third and later lighting, the LED $3_n$ is turned ON for the periods of $[t_1]$ and $[t_2]$. Because the quantity of the luminous energy of the LED is the product of the light-emitting output (W) and the lighting time (t), unevenness of the quantity of light from the respective LED can be corrected by varying the lighting time as described above.

However, conventional apparatus for correcting the quantity of light as described above requires preparation of new data which are previously synthesized and processed for the lighting data and the correcting data, rendering the apparatus complex. In addition, the synthesized data must be repeated several times, so that there are no problems of requirement of much time for calculation and impossibility of high-speed printing. Such a conventional apparatus is shown in U.S. Pat. No. 4,455,562.

SUMMARY OF THE INVENTION

In view of the above problems, it is an object of the present invention to provide an apparatus for correcting the quantity of light from an optical printer which is of a simple structure, and yet which can correct the quantity of light from respective luminous elements and can print at high speed.

The apparatus for correcting the quantity of light from the luminous elements in the present invention is provided with a producing circuit for producing a plural number of timing signals which are different in the pulse widths and the output timing and a combining circuit for combining the timing signals and a correcting data thereby driving the respective luminous elements in accordance with the correcting signal obtained by the combination of the plural number of signals received from said producing circuit and the correcting data supplied to said combination circuit.

In the apparatus for correcting the quantity of light emitted from the optical printer in the present invention, a plural number of the timing signals of different pulse widths and the output timing are combined in accordance with the correcting data and the respective luminous elements are driven by the correcting signal obtained as the result of the combination.

A—Producing circuit
B—Combination circuit
C—Lighting circuit
3—LED (Luminous elements)

Description of the Preferred Embodiment

One embodiment of the present invention is described with reference to the drawings.

Figure 1:
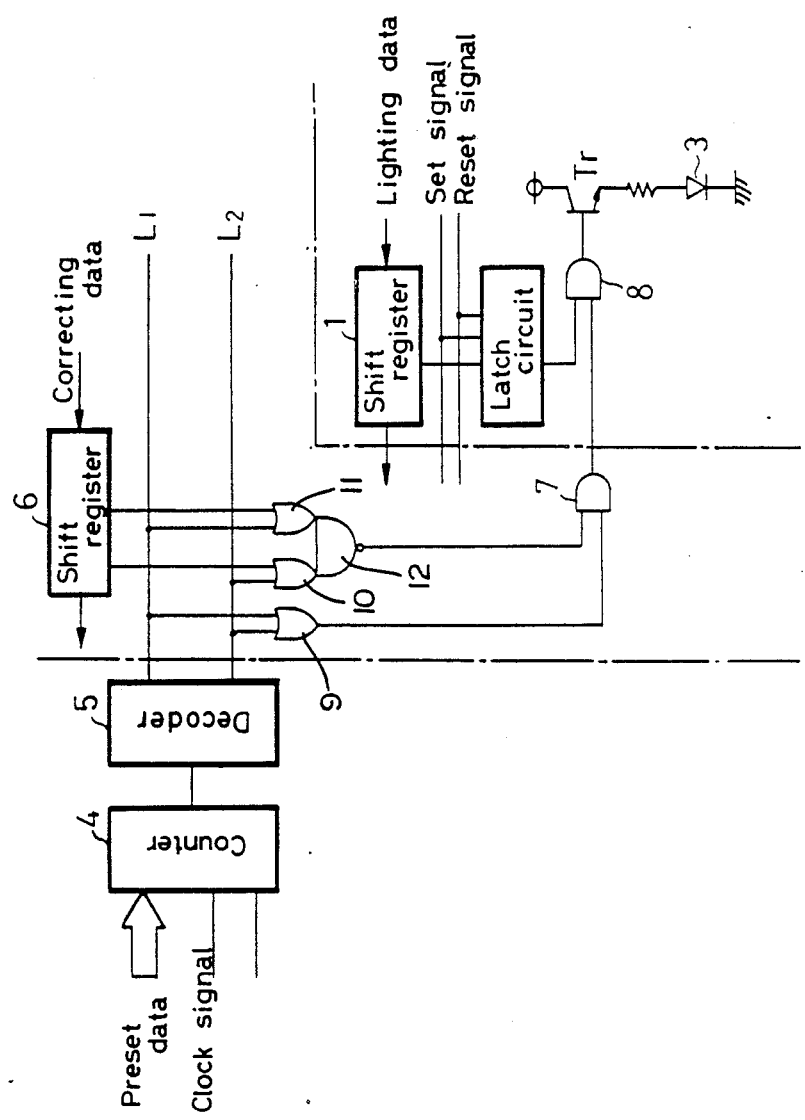
FIG. 1 is a diagram showing a structure of a circuit illustrating one embodiment of the present invention.
Figure 2:
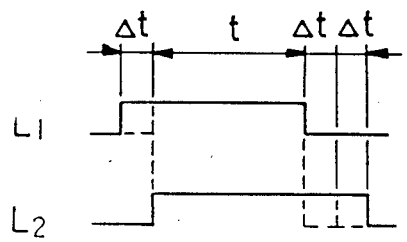
FIG. 2 is a waveform diagram showing one example of timing signals.

FIG. 1 is a diagram illustrating the structure of the apparatus of the present invention for correcting the quantity of light produced by plural luminous elements in an optical printer to ensure that each of said luminous elements presents an equal intensity of light to a photo sensitive printing medium. The apparatus is composed of a several circuits, the first of these being a producing circuit A for producing a plural number of timing signals of different pulse widths and output timing. The producing circuit A applies a plural number of timing signals (the two kinds shown in FIG. 2) to the respective lines $L_1$ and $L_2$ by means of a counter 4 and a decoder 5. These signals are different in their pulse widths and output timing, and the signal on line 2 rises later than the signal on line 1 by $\Delta t$, and sets layer by $2 \Delta t$.

The combination circuit B includes a shift register 6 having an input to receive correcting data, a first OR gate 9 having two imputs and an output, a second OR gate 10 having two inputs and an output, a third OR gate 11 having two inputs and an output, a NAND gate 12, and a two input AND gate 7. As shown in FIG. 1, the first OR gate 9 has one each of its inputs connected to lines $L_1$ and $L_2$ coming from the decoder 5 of the producing circuit. The output of the first OR gate 9 is connected to one of the inputs of the two input AND gate 7.

The second OR gate 10 has one of its inputs connected to the $L_2$ output of decoder 5, with the other input connected to the shift register 6. The third OR gate 11 has one of its inputs connected to the $L_1$ output of the decoder 5, with the other input also connected to the shift register 6. The NAND gate 12 has its two inputs connected, one each, to the output of the second OR gate 10 and the third OR gate 11, with the output therefrom connected to the other input of AND gate 7. A signal representing the correcting data is fed into the input of shift register 6. Since each luminous element of LED in an optical printer will differ in its luminousity because of manufacturing variations, it is necessary that the LED's having less luminousity be illuminated for a longer period of time to have uniform printing in the optical printer. Therefore, the luminousity of all the LED's in the optical printer has been previously measured and ranked. Thus, the correcting data input into the shift register 6 represents a luminousity ranking of the luminous elements.

Figure 3:
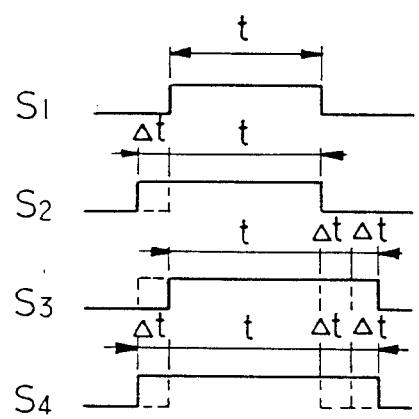
FIG. 3 is a waveform diagram of a correcting signal delivered from the AND circuit in FIG. 1.
Figure 4:
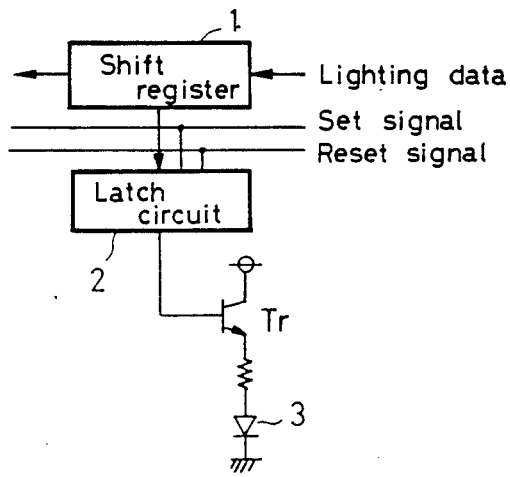
FIG. 4 is a diagram showing a structure of a circuit in a conventional example.
Figure 5:
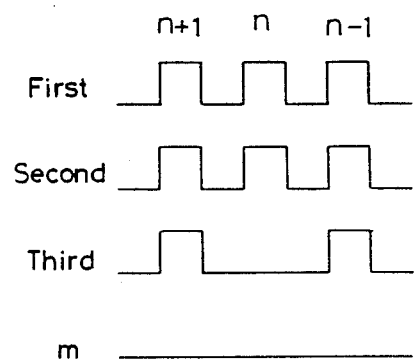
FIG. 5 is a waveform diagram of one example of lighting data.
Figure 6:
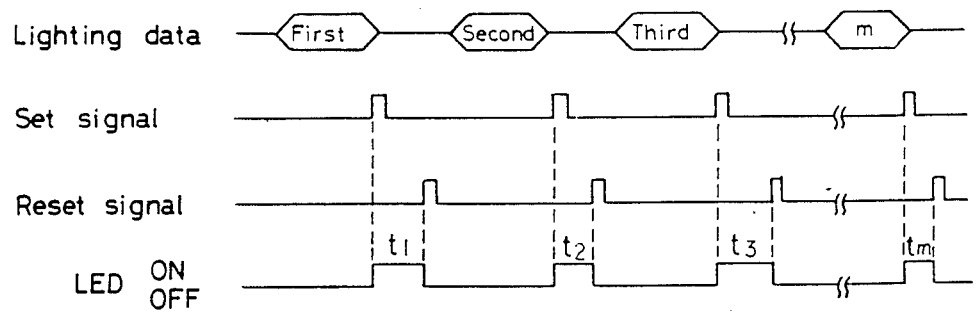
FIG. 6 is a time chart showing the action of the circuit in FIG. 4.

FIG. 3 illustrates the correcting signal delivered from the output of the AND gate 7 to one of the inputs of the AND gate 8 of the lighting circuit C for each of the four possible input states ([00], [01], [10], [11]) of AND gate 7 produced by the above described circuitry. For example, when both inputs of the AND gate 7 are low, a signal of duration time t is produced. If the input of AND gate 7 connected to the output of NAND gate 12 is low, and the other input is high, a signal duration of t plus $\Delta t$ is produced, while if the input of AND gate 7 connected to output of AND gate 12 is high, and the other input is low, a signal of duration t plus 2 $\Delta t$ is produced, and if both inputs of AND gate 7 are high, a signal of duration t plus 3 $\Delta t$ is produced. These various signals are supplied to one of the inputs of AND gate 8 found in lighting circuit C, with the other input coming from the latch circuit, to turn on each transistor for a varying period of time depending on the luminousity ranking of its associated LED.

Thus correcting signals from the AND circuit 7 are applied to the AND circuit 8 of the lighting circuit C together with the lighting data signal from the shift register 1 delivered via the latch circuit 2, and the output of the AND circuit 8 drives the transistor Tr to turn on and out the LED 3. In this case, the LED 3 is turned on in the state where the lighting time is corrected according to the correcting data whereby the unevenness of the luminous outputs is correcting so as to control the quantity of light equal to that of the LED. Accordingly, there is no uneven printing density when printing out is performed whereby the printing quality is improved.

The apparatus is of such a simple construction which enables correction of the quantity of light from the individual luminous elements and requires no calculation for correction, thus enabling high-speed printing. The kind and the combination of the timing signal may be suitably settled.

As described above, the present invention is adapted to drive the respective driving elements based on the correcting signal obtained by combining a plural number of timing signals of different pulse widths and output timing thereof, with a signal such that the apparatus in the present invention is effective for enabling correction of the quantity of light from the respective luminous elements and high-speed printing.

What is claimed is:

1. An apparatus for correcting the differences in the quantity of light produced by plural luminous elements in an optical printer to ensure that each of said luminous elements presents an equal intensity of light to a photo sensitive medium, said apparatus comprising, in the optical printer, a plural number of said luminous elements therein, a producing circuit for producing a plural signals of different pulse width and output timing, number of timing, a lighting circuit connected to said luminous elements for driving the same, and a combining circuit connected to said producing circuit and said lighting circuit for combining said timing signals from said producing circuit with a correcting data representing said differences in luminosity to produce a correcting signal, and supplying said correcting signal to said lighting circuit, thereby driving the respective luminous elements based on a correcting signal obtained by said combination of said timing signals and said correcting data.

2. The apparatus for correcting the quantity of light from an optical printer as defined in claim 1, including means for driving the respective luminous elements on the basis of a correcting signal produced by a combination circuit, and a lighting signal produced by a producing circuit.

3. The apparatus as defined in claim 1, wherein said producing circuit comprises a counter for counting a clock signal, and a decoder connected to said counter.

4. The apparatus defined in claim 1, including means for driving the respective luminous elements on the basis of a correcting signal produced by a combination circuit and a lighting signal produced by a producing circuit.

5. The apparatus for correcting the quantity of light from an optical printer as defined in claim 1, wherein said producing circuit comprises a counter for counting a clock signal, and a decoder connected to said counter.

6. The apparatus defined in claim 5, wherein said combining circuit comprises a shift register for temporarily memorizing the correction data, and a logic circuit, said logic circuit including a plurality of OR gates, a NAND gate, and an AND gate, for receiving signals from said producing circuit and said shift register and supplying a correcting signal to said lighting circuit.

7. The apparatus for correcting the quantity of light from an optical printer as defined in claim 2, wherein said combining circuit comprises a shift register for temporarily memorizing the correction data, and a logic circuit, said logic circuit including a plurality of OR gates, a NAND gate and an AND gate, for receiving signals from said producing circuit and said shift register and supplying a correcting signal to said lighting circuit.

8. The apparatus for correcting the quantity of light from an optical printer as defined in claim 7, wherein said combining circuit additionally includes a first OR gate having inputs and an output, with said inputs connected to said producing circuit, a second OR gate having inputs and an output, with one of said inputs connected to said producing circuit and the other of said inputs connected to said shift register, a third OR gate having inputs and an output, with one of said inputs connected to said producing circuit, and the other of said inputs connected to said shift register, a NAND gate having an output and having its inputs connected to the outputs of said second and said third OR gates, and an AND gate having one input each connected to the output of said first OR gate and said NAND gate, and having its output connected to said lighting circuit.

9. An apparatus for correcting the differences and the quantity of light produced by plural luminous elements in an optical printer to ensure that each of said luminous elements presents an equal intensity of light to a photo sensitive medium, said apparatus comprising a producing circuit for producing plural timing signals of different pulse widths and output timing, a lighting circuit for connection to luminous elements in an optical printer for driving the same, and a combining circuit connected to said producing circuit and said lighting circuit for combining said timing signals from said producing circuit with correcting data representing said differences in luminousity to produce a correcting signal, and supplying said correcting signal to said lighting circuit, thereby enabling said lighting circuit to drive said luminous elements based on a correcting signal obtained by said combination of said timing signals and said correcting data.

* * * * *

UNITED STATES PATENT AND TRADEMARK OFFICE
CERTIFICATE OF CORRECTION

PATENT NO. : 4,937,591

DATED : June 26, 1990

INVENTOR(S) : Miyake et al.

It is certified that error appears in the above-identified patent and that said Letters Patent is hereby corrected as shown below:

In Column 3, lines 58-68 and column 4, lines 1-8,
Claim 1 should read as follows:

1. An apparatus for correcting the differences in the quantity of light produced by plural luminous elements in an optical printer to ensure that each of said luminous elements presents an equal intensity of light to a photo sensitive medium, said apparatus comprising, in the optical printer, a plural number of said luminous elements therein, a producing circuit for producing a plural number of timing signals of different pulse widths and output timing, a lighting circuit connected to said luminous elements for driving the same, and a combining circuit connected to said producing circuit and said lighting circuit for combining said timing signals from said producing circuit with a correcting data representing said differences in luminosity to produce a correcting signal, and supplying said correcting signal to said lighting circuit, thereby driving the respective luminous elements based on a correcting signal obtained by said combination of said timing signals and said correcting data.--.

In column 4, line 64, claim 9, insert --a-- after "producing".

In column 5, line 2, claim 9, insert --a-- after "with".

Signed and Sealed this

Seventh Day of January, 1992

Attest:

HARRY F. MANBECK, JR.

*Attesting Officer*           *Commissioner of Patents and Trademarks*